United States Patent
Border et al.

(10) Patent No.: US 7,561,789 B2
(45) Date of Patent: Jul. 14, 2009

(54) AUTOFOCUSING STILL AND VIDEO IMAGES

(75) Inventors: John N. Border, Walworth, NY (US); Russell J. Palum, Rochester, NY (US); Bruce H. Pillman, Rochester, NY (US); Lynn Schilling-Benz, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 376 days.

(21) Appl. No.: 11/427,531

(22) Filed: Jun. 29, 2006

(65) Prior Publication Data
US 2008/0002959 A1   Jan. 3, 2008

(51) Int. Cl.
G03B 7/099 (2006.01)

(52) U.S. Cl. .................. 396/111; 396/89; 396/429; 396/459; 348/345

(58) Field of Classification Search .................. 396/111, 396/459, 89, 95, 439; 348/345
See application file for complete search history.

(56) References Cited

U.S. PATENT DOCUMENTS

| 4,201,456 A | 5/1980 | Wolbarsht | 353/101 |
| 4,606,630 A | 8/1986 | Haruki et al. | 356/1 |
| 4,631,394 A | 12/1986 | Horikawa | 250/201 |
| 4,972,269 A * | 11/1990 | Fukushima et al. | 348/366 |
| 5,519,202 A * | 5/1996 | Kusaka | 250/201.8 |
| 6,326,998 B1 * | 12/2001 | Palum | 348/342 |
| 6,473,126 B1 * | 10/2002 | Higashihara et al. | 348/345 |
| 6,477,327 B1 * | 11/2002 | Imai | 396/89 |
| 6,496,225 B1 * | 12/2002 | Higashihara et al. | 348/345 |
| 6,700,615 B1 * | 3/2004 | Satoh | 348/345 |
| 6,933,978 B1 * | 8/2005 | Suda | 348/345 |
| 2001/0016119 A1 * | 8/2001 | Gfeller | 396/374 |
| 2003/0118245 A1 * | 6/2003 | Yaroslavsky et al. | 382/255 |
| 2006/0066744 A1 * | 3/2006 | Stavely et al. | 348/352 |

FOREIGN PATENT DOCUMENTS

| JP | 09-184973 | 7/1997 |
| JP | 2001-174496 | 6/2001 |

* cited by examiner

Primary Examiner—W. B. Perkey
Assistant Examiner—Warren K Fenwick
(74) Attorney, Agent, or Firm—Raymond L. Owens

(57) ABSTRACT

A method for operating an autofocus system for focusing an image on an electronic imager includes providing an adjustable lens system defining an optical path for scene light and having at least one movable lens to focus an image of the scene onto the electronic imager; and causing a first portion of the scene light to be obscured so that the electronic imager captures a first autofocus image and causing a second different portion of the scene light to be obscured so that the electronic imager captures a second autofocus image wherein portions of the first and second autofocus images are offset. The method further includes moving the movable lens to a position so that an image to be captured will be in focus.

17 Claims, 13 Drawing Sheets

_US 7,561,789 B2_

AUTOFOCUSING STILL AND VIDEO IMAGES

FIELD OF THE INVENTION

The present invention relates to autofocus systems for image capture devices that can be used for capturing a series of images for video or burst captures as well as still images.

BACKGROUND OF THE INVENTION

Autofocus in a digital camera, typically used for capturing still images and a series of still images for video segments, often uses a through the lens autofocus system based on a contrast analysis of a series of say 5-20 or more subsampled autofocus images taken with a moveable lens in different positions. Subsequently, the autofocus images are analyzed for contract and the moveable lens position that delivers the image with the highest contrast is deemed the best focus condition. The moveable lens is then returned to the position that delivered the highest contrast or an interpolated position between the at least two autofocus images before the still image is captured. Although this approach does deliver an accurate focus condition, it is slow due to the many autofocus images that must be captured and analyzed.

During video capture, the autofocus images are derived from the same series of still images or frames that compose the video segment. Consequently, the process of autofocusing causes the 5-20 or more out of focus frames to be produced in the video each time the scene changes. As a result, during video capture with pan movements of the camera where the scene changes continuously, large portions of the video segment are actually out of focus. Ideally, the autofocus system would be faster when capturing video as well as still images and, in the case of video capture, each frame would be focused so that the number of out of focus frames is reduced. This is especially important in enabling images from video segments to be printed or used in other fashions.

For autofocus to become fast enough to enable frame by frame autofocus at the typical video frame rate of 30 frames/second, several improvements are needed throughout the autofocus system. First, a focus measurement system is needed that can provide a measure of focus quality that can be completed within $\frac{1}{30}$ second or faster. The focus measurement must provide enough information to accurately guide the movement of the moveable lens in terms of distance and direction to achieve the desired focus quality within $\frac{1}{30}$ second as well. Second, the moveable lens movement control system must be fast enough to reposition the moveable lens within $\frac{1}{30}$ sec. Third, the entire autofocus system, composed of the focus measurement system and the moveable lens movement control system, must be accurate over the length of time that the video will be captured, which is typically on the order of minutes but could be longer.

There are several types of focus measurement systems in the prior art that are sufficiently fast to meet the $\frac{1}{30}$ sec requirement: a dual lens rangefinder module, a split color filter system, a split aperture device. All of these focus measurement systems require special modifications to work in the video environment to deliver frame by frame autofocus.

Dual lens rangefinder modules can be purchased from Fuji Electric in several models such as the FM6260W. The Fuji Electric rangefinder module is described in U.S. Pat. No. 4,606,630 to Haruki. Dual lens rangefinder modules contain two lenses that are separated by a distance along with two matching sensor areas to enable matched pairs of low resolution images to be captured. The matched pairs of low resolution images are then analyzed for correlation between the two images to determine the offset between the two images caused by the separation between the two lenses. The offset information is then used along with the lens separation distance to calculate the distance to the scene by triangulation. The calculated distance to the scene is used to guide the positioning of the moveable lens to produce the best image quality based on a calibration curve established between the distance to the scene as measured by the dual lens rangefinder module and a series of best focused images as produced by the through the lens autofocus system. The response time of the Fuji FM6260W modules is advertised as 0.004 sec in high sensitivity mode, which is well within the $\frac{1}{30}$ sec required for video autofocus. The accuracy of dual lens rangefinder modules however, are typically influenced by changes in the environmental conditions such as changes in the temperature or humidity. Typically, these dual lens rangefinder modules are not used independently for autofocus in digital cameras but instead are used as a rough focus adjustment that is supplemented by a through the lens contrast based autofocus system. The problem with the dual lens rangefinder modules is that the calibration between the dual lens rangefinder module and the moveable lens position is not stable within the normal operating environment for digital cameras. Environmental conditions such as changes in temperature and humidity can cause the calculated distance to the scene produced by the dual lens rangefinder module to change by over 10%. In addition, the measured position of the moveable lens in the moveable lens control system is prone to environmentally induced changes as well.

Both a split color filter system and a split aperture device use a split aperture in the lens system to create images that can be interpreted for focus information. The split aperture creates at least two optical paths for the light passing through the lens to create at least two autofocus images at the sensor. By splitting the optical path at the aperture of the lens system, each of the at least two optical paths creates a full image without shading but reduced light intensity at the image sensor from the split aperture.

In the case of the split color filter system, a split color filter is inserted into the optical path of the lens at the aperture position. The split color filter is constructed so that the filter area is divided into at least two different areas with different colors in the different areas. Two autofocus images are then captured simultaneously as a first autofocus image overlaid on top of a second autofocus image, but since the first and the second autofocus images are different colors they can be differentiated in the overlaid image in areas where they do not overlap. In the case of the split aperture device, the aperture is sequentially partially blocked over at least two different portions of the aperture, to create the at least two optical paths. Because the at least two optical paths in the split aperture device do not have different colors, the split aperture device requires that autofocus images are captured for each partially blocked condition resulting in at least two autofocus images. In both cases, the difference between the at least two optical paths causes the autofocus images to be displaced laterally in proportion to the degree of defocus and direction of defocus for an object in the image.

A split color filter system for autofocus was described in Keiichi JP 2001-174496. In this case, a color filter composed of two different colors on opposing sides of the aperture creates two overlaid images of different colors (typically blue and red) on the sensor. Any defocus present in the image creates an offset between the two images which then shows up as color fringes on either side of the object in the image. Movement of the focusing lens reduces or enlarges the color fringes in the image depending on the distance from focus. When the image is well focused, the color fringes disappear. Defocus inside of the focal point causes the fringes to be one color on one side and the other color on the other side of the object in the image. Defocus outside of the focal plane results in the colors of the color fringes being reversed. Consequently, with this approach, one image taken with the split color filter delivers an autofocus image that can be analyzed to determine the degree of defocus and the direction of defocus. Keiichi does not use a split color filter system for autofocus during video and in addition, the split color filter used by Keiichi is fixed in the optical path so that substantial light losses are incurred from the split color filter in the optical path during capture of the video images. In general, the addition of a split color filter to the optical path introduces light losses to the optical system which tend to slow down the autofocus system and make autofocusing under low light conditions difficult.

Split aperture devices for autofocus were described by Kurahashi in JP 1997-184973, Horikawa in U.S. Pat. No. 4,631,394, and Wolbarsht in U.S. Pat. No. 4,201,456. In these disclosures, the aperture is alternately partially obstructed thereby creating multiple optical paths. The autofocus images that are captured for each of the alternate multiple optical paths are shifted laterally when compared one to another in proportion to the distance from focus. In the case where the optics are focused, the multiple images are not shifted laterally when compared one to another as the aperture is alternately partially obstructed. A set of images are collected for at least two of the optical paths in which the aperture is partially blocked. A comparison of the image set enables the lateral offsets between images to be identified and the related distance from focus to be calculated. Consequently, with one set of images with at least two different partial obscurations of the aperture, the lateral difference between the at least two images identifies the degree of defocus and the direction of defocus. However, Kurahashi, Horikawa, and Wolbarsht do not use a split aperture device for fast autofocus of stills or for autofocus during video capture.

Therefore, a need exists for autofocus systems to be modified for use during video capture to provide a frame by frame autofocus.

SUMMARY OF THE INVENTION

It is an object of the present invention to provide an autofocus system for image capture that overcomes the above identified problems. This object is achieved by a method for operating an autofocus system for focusing an image on an electronic imager, comprising:

a. providing an adjustable lens system defining an optical path for scene light and having at least one movable lens to focus an image of the scene onto the electronic imager;

b. causing a first portion of the scene light to be obscured so that the electronic imager captures a first autofocus image and causing a second different portion of the scene light to be obscured so that the electronic imager captures a second autofocus image wherein portions of the first and second autofocus images are offset; and c. moving the movable lens to a position so that an image to be captured will be in focus.

The present invention provides a way for autofocus of image capture devices that will allow autofocus on a frame by frame basis. For example: if at least a substantial portion of the video frames during video capture are at 24 frames/sec or faster (30 frames/sec is typical) the present invention assures that essentially all the video images will be in focus. The autofocus arrangement is also useable for autofocus during the capture of still images.

As the resolution and image quality of video images captured by digital capture devices improves, the print quality of the individual video images will become much more important to consumers. By improving the focus quality of all the video images, the overall quality of the video will be improved and the print quality of each of the video images will be improved as well. Consequently, the continuous use of an autofocus system which is capable of making focus adjustments for video images or still images such as a split aperture device will be important.

All of the split aperture device embodiments of the invention share the following advantages. First, since the taking lens is used for both the autofocus image captures and the video image captures, there are no parallax issues. Second, since the high quality taking lens is used along with the full resolution sensor to capture the autofocus images, the possibility exists to do autofocus on very high resolution images or high resolution portions of images such as in multi-spot autofocus. Third, the split aperture device can also be used for autofocus of multiple images in a burst mode or during capture of single still images. Fourth, all the split aperture device embodiments operate as a shutter for image capture devices.

DETAILED DESCRIPTION OF THE INVENTION

Because digital cameras employing imaging devices and related circuitry for signal capture and correction and for exposure control are well known, the present description will be directed in particular to elements forming part of, or cooperating more directly with, method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

This description of a particular camera configuration will be familiar to one skilled in the art, and it will be obvious that many variations and additional features are present. The described autofocus system includes lenses that can be detached and replaced. It will be understood that the present invention is applied to any type of digital camera, where similar functionality is provided by alternative components. The present invention can also be practiced using non-camera devices such as mobile phones and automotive vehicles.

Figure 1:
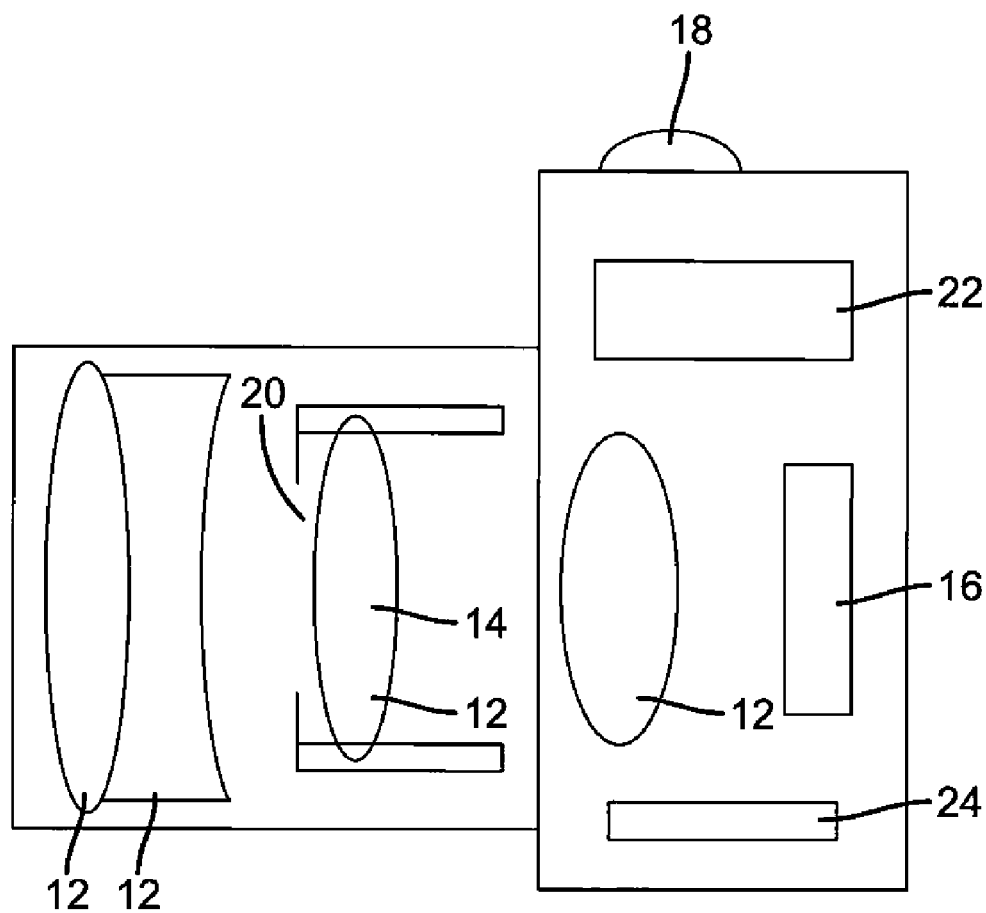
FIG. 1 is schematic diagram of a typical prior art digital camera showing the major components.

A schematic diagram of the typical prior art digital camera showing major system components is shown in FIG. 1.

The digital camera includes an adjustable lens system 12 with at least one moveable lens 14 that focuses an image onto an electronic imager 16. A button 18 when depressed by an operator initiates the capture of a still image, a short series of images in a burst or a longer series of images as in a video and an aperture or iris 20 for controlling the amount of light that passes to the electronic imager 16. A digital signal processor 22 is capable of analyzing data to identify the focusing conditions that deliver the best focus quality. The digital signal processor 22 also controls a conventional structure for moving the moveable lens 14 to focus the image onto the electronic imager 16. Further, a digital storage element 24 for storing the digital information corresponding to the still image or the series of images that constitutes the video.

Figure 2:
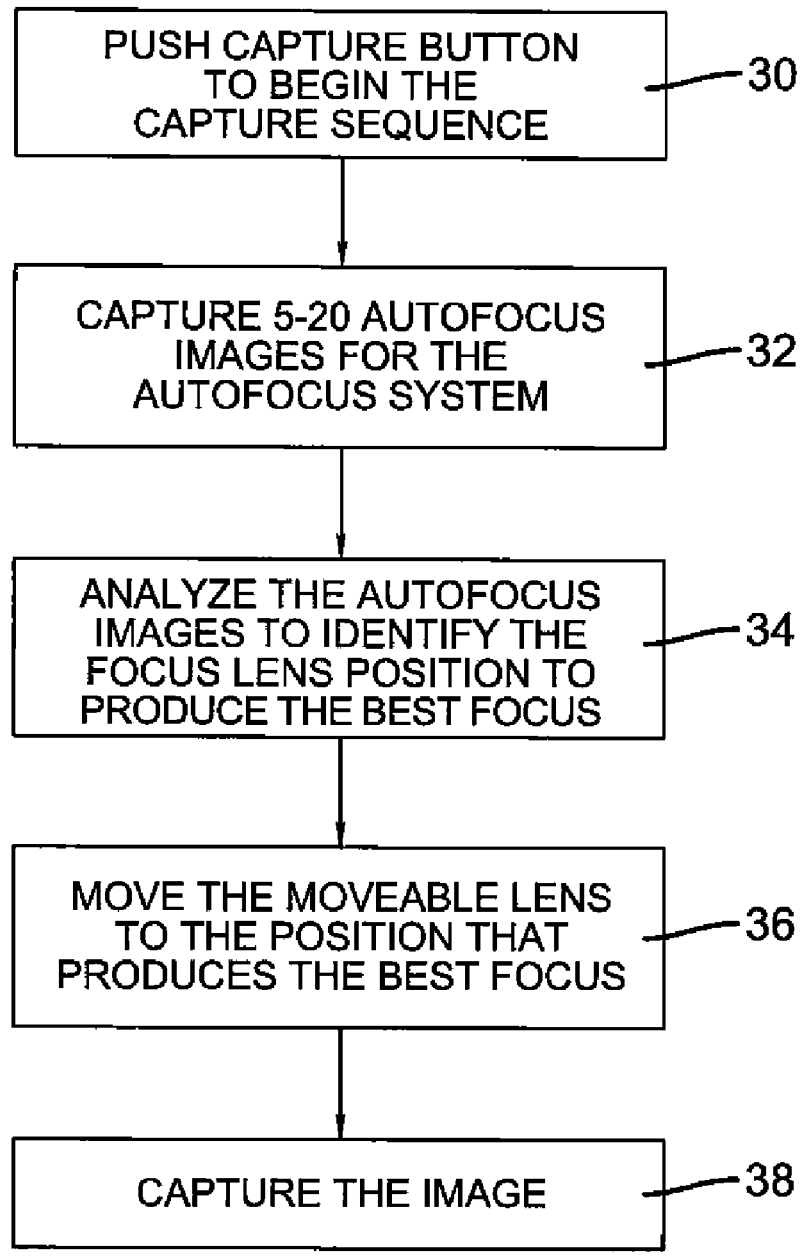
FIG. 2 is a flow chart for an autofocus system for prior art still image capture.

In FIG. 2 a flow chart of a typical prior art event sequence to capture a still image for the prior art digital camera of FIG. 1 is shown. In step 30, the button 18 is depressed to begin the capture sequence. More specifically, the button 18 has three different positions S0, S1 and S2 that will be described later in the disclosure. In step 32, 5-20 or more autofocus images are captured in a conventional manner with the moveable lens 14 in a series of different positions. In step 34, the digital signal processor 22 analyzes digitized autofocus images to identify the moveable lens position that will produce the best focus. In step 36, the moveable lens 14 is moved to the position that produces the best focus. In step 38, the digital camera of FIG. 1 automatically captures the focused image.

Figure 3:
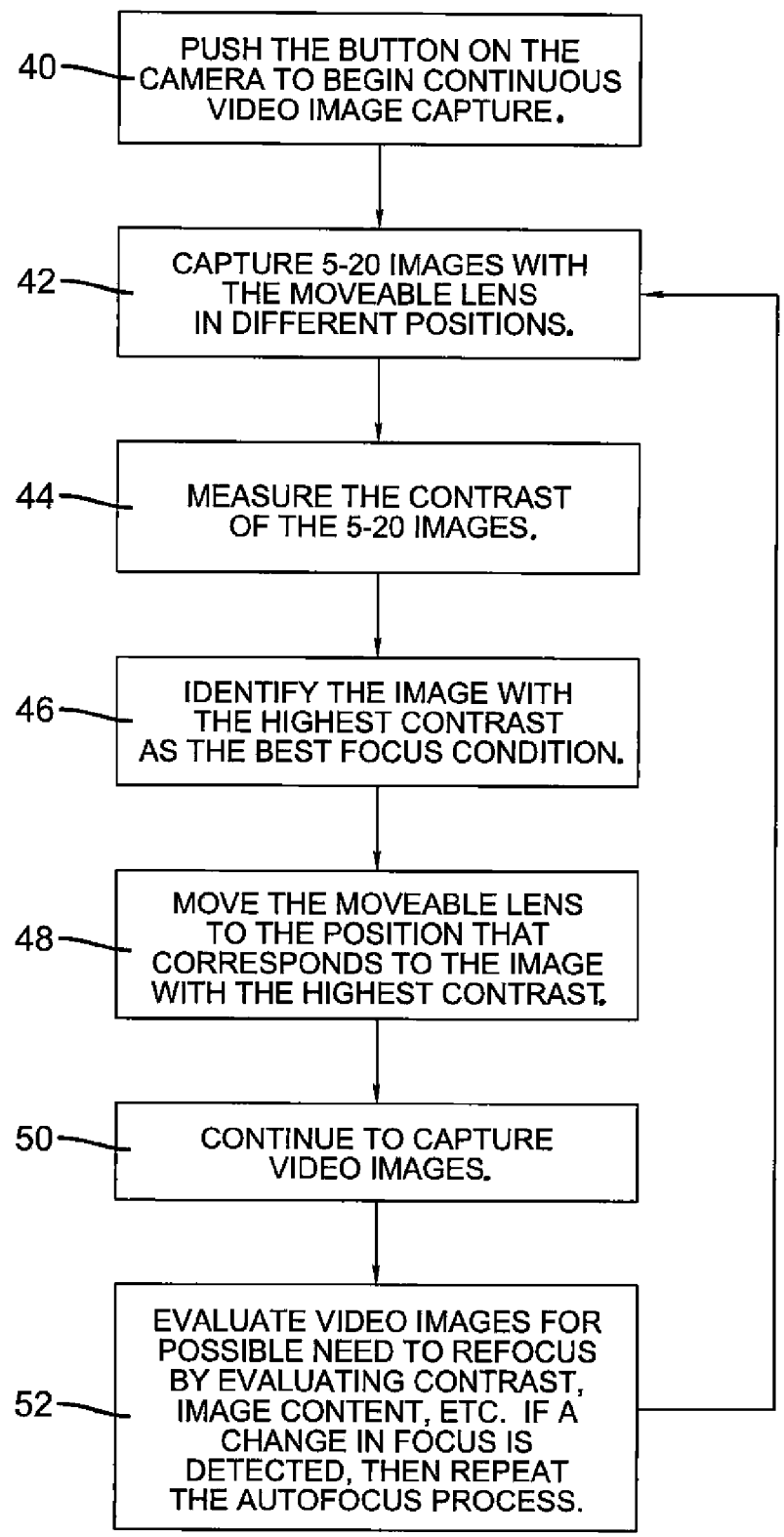
FIG. 3 is a flow chart for the typical prior art capture of video.

A flow chart of a prior art autofocus system for video image capture is shown in FIG. 3. In Step 40, the button 18 is depressed to begin video capture. Autofocus for video uses a similar procedure to that used for still image capture with the difference being that, the autofocus images and the video images are the same images. The autofocus images are a small portion of each of the video images. In the through the lens autofocus approach, in order to identify the conditions for best focus, 5-20 or more autofocus images must be generated with the moveable lens in different positions with the result being that many of the video images are not well focused. See Step 42. In step 44, the contrast of each of the images is measured by the digital signal processor 22. In step 46, the digital signal processor 22 identifies the image with the highest contrast as the image with best-focused condition. In step 48, the moveable lens is moved to the position that corresponds to the image with the highest contrast. Capture of the video images is continued in step 50. In step 52, the digital image processor 22 repeats similar functions to evaluate the need for refocusing. Each time a change in focus conditions in the scene is detected during the video capture, the autofocus procedure is repeated and more video images are produced that are not well focused.

When a prior art autofocus system is used for either still image or video capture, a series of 5-20 or more autofocus images must be captured with the moveable lens in different positions. A portion of each of the autofocus images are then analyzed to determine the position of the moveable lens that produces the best focus quality. The moveable lens is then moved back to the position that produces the best focus quality and the still image is captured. Although this approach produces very accurately focused images, a substantial delay time is incurred between the time when the operator pushes the capture button and the time when the image is captured due to the many autofocus images that must be captured and measured for contrast prior to the time when the image is captured. Consequently, this approach is not suitable for still image capture in situations where fast autofocus is needed such as at sporting events or for video capture situations where focus quality is important.

The following information should be helpful to appreciate the present invention before it is discussed in more detail. It will be appreciated that an important feature of the present invention provides an autofocus system that is capable of focusing each frame of a video individually so that substantially all of the video images are well focused.

For frame by frame autofocus during video capture at the typical video capture rate of 30 frames/sec, the present invention is capable of operating on a $\frac{1}{30}^{th}$ sec cycle continuously. In accordance with this specification, frame by frame autofocus is interpreted to include the cases wherein: the focus measurement and the moveable lens movement are done prior to the capture of a video frame; the case wherein the focus measurement or moveable lens movement are done during the capture of the autofocus images or the video images; and also the case wherein the autofocus information is gathered in one video frame and the moveable lens movement is applied to the next video frame. In all cases, autofocus control will be applied to each video image frame. In general, the changes in focus conditions and the associated movements of the moveable lens required to correct for the changes in focus conditions from one frame to the next will be small. In some cases it may be preferable to not reposition the moveable lens provided the calculated distance from focus is within the blur circle of the lens. In some other cases it may be preferable to limit the amount of change in the moveable lens position between frames to provide a smoother transition of focus between frames. The invention describes arrangements for creating a fast and accurate measurement of focus that can be used in an autofocus system to adjust for changes in focus conditions on a frame by frame basis when capturing a series of images for a video at a video capture rate of approximately 24 frames/sec or faster.

An autofocus system in accordance with the present invention provides a focus measurement that can be used to measure the focus quality of an image at a frame rate of 24 frames/sec or faster so that focus adjustments can be made on every frame of a video segment while increasing focus accuracy and increasing the use of the available light for image capture. By enabling every frame to be focused, the overall image quality of the video is enhanced and as a result the image quality of the preview image displayed on the camera, which is based on a version of the video, is enhanced during video capture and still capture. The autofocus systems in accordance with the invention can also be used during still capture for fast autofocus.

The invention relies on the use of half aperture blockers to alternately block a portion of one side of the aperture and then block a portion of the other side of the aperture. In some cases, it is beneficial to remove the half aperture blocker or make it substantially transparent for a portion of the video frame capture or the still image capture. The half aperture blocker can take several forms both electro-optical: as in a liquid crystal element or an electro-chromic device; or a mechanical device: as in a rotating disk with portions removed or a pivoting member or a sliding member. In the spirit of the invention, any device capable of providing the three (3) operating states of restricting the light at the aperture first on one side, then on the other side and then substantially unrestricted would provide suitable functionality for the invention. It should also be noted that the orientation of the half aperture blockers is not important in that the device would work equally well if the half aperture blockers alternately blocked the top and bottom of the aperture or the opposite sides of the aperture.

Figure 4:
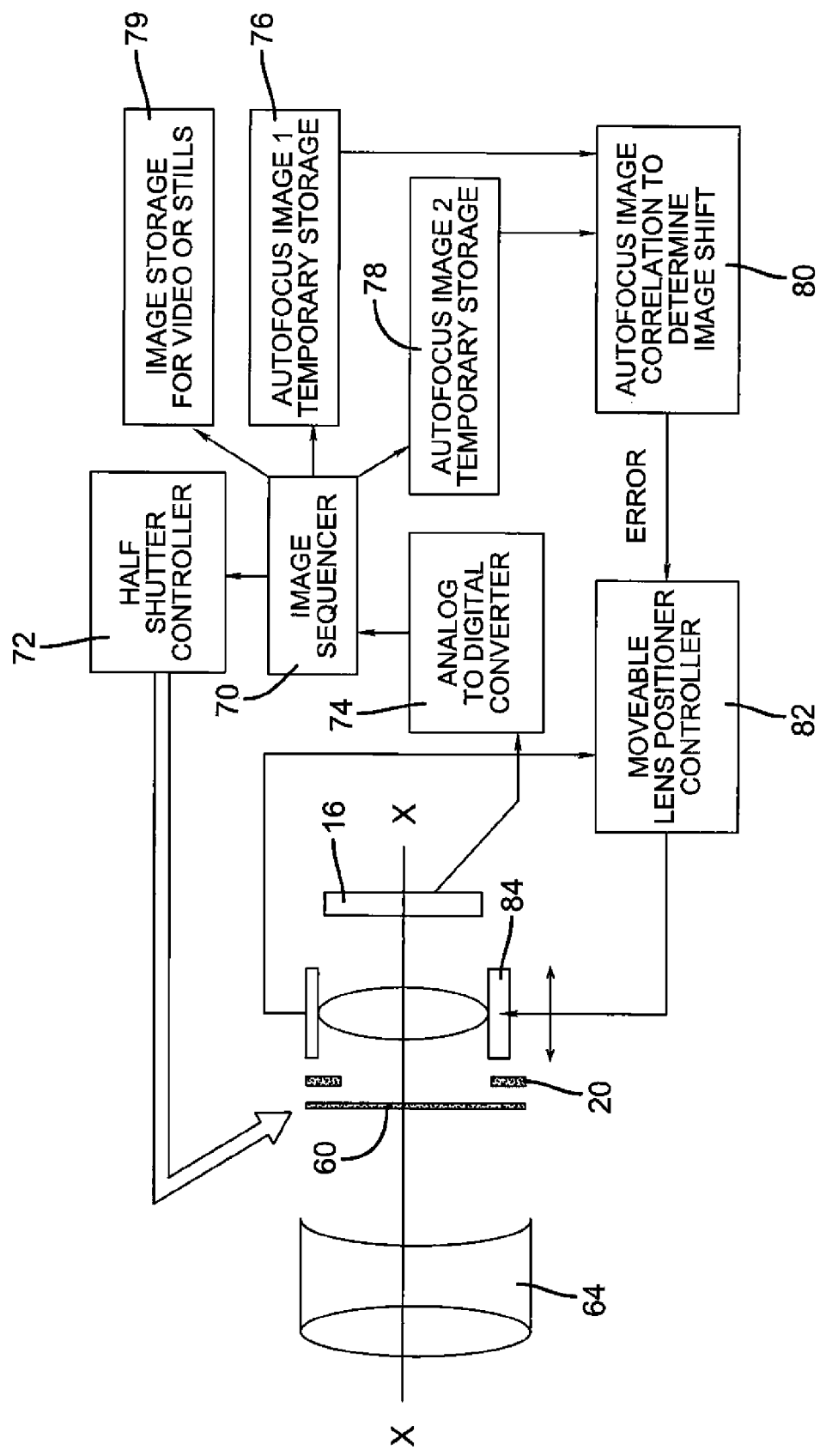
FIG. 4 is a schematic block diagram of an autofocus system in accordance with the present invention; for focusing an image on an electronic imager.
Figure 5:
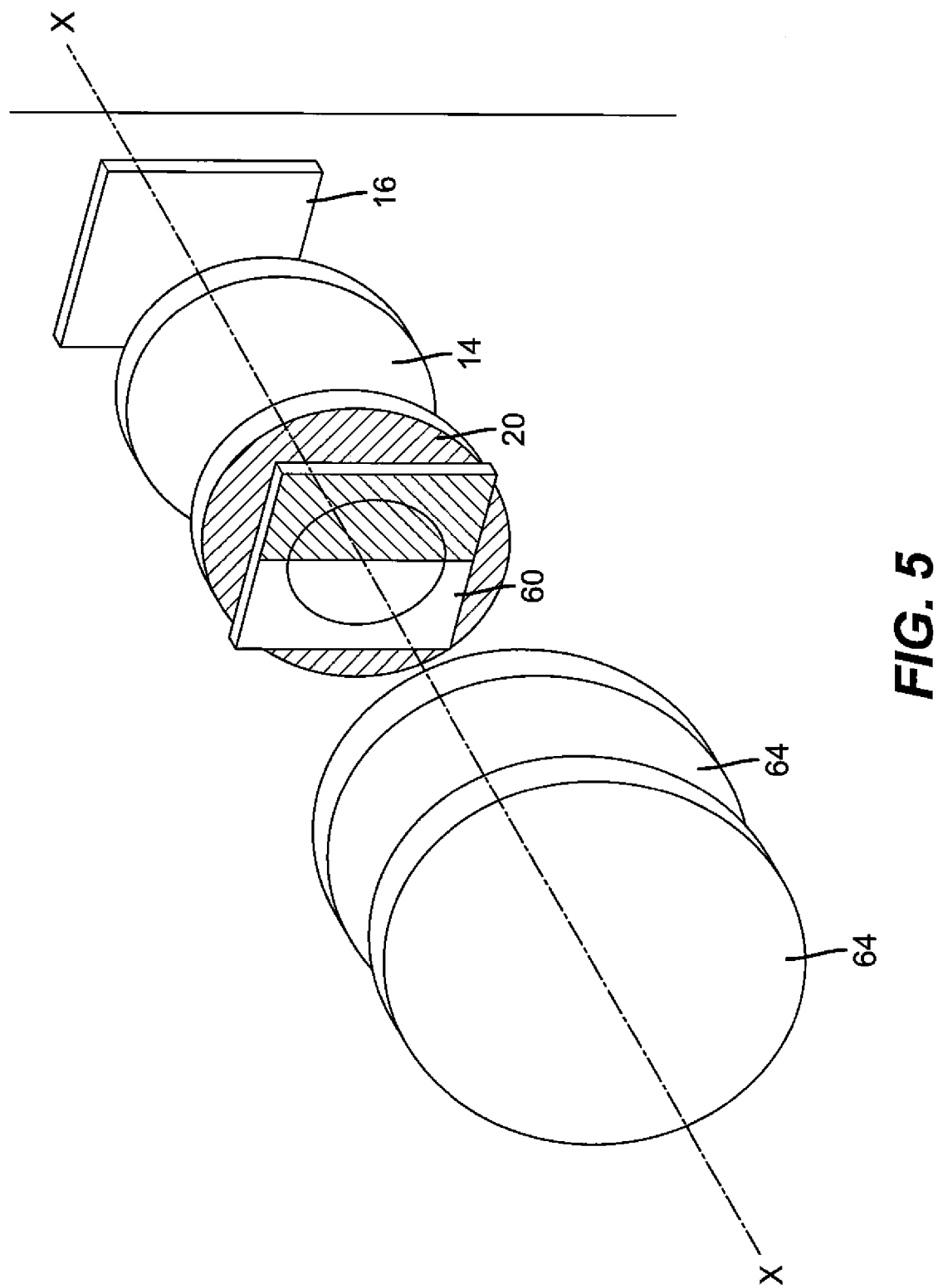
FIG. 5 is a perspective of a portion of the autofocus system of FIG. 4.

A schematic block diagram of an autofocus system with a split aperture device as described by the invention is shown in FIG. 4 and a perspective of a lens assembly with a split aperture device 60 as described by the invention is shown in FIG. 5. In this case, two autofocus images are captured while the two sides of the aperture are alternately blocked for example $1/120^{th}$ sec each, the video frame is captured separately from the autofocus images while the aperture is unblocked or simultaneously with the autofocus images. The autofocus images and the video frames can use the same or different pixels as captured on the electronic imager 16.

Figure 6A:
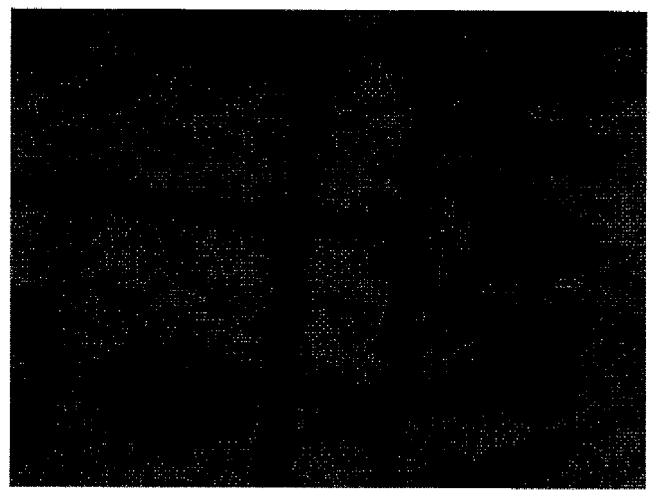
FIGS. 6a, 6b, and 6c, are representations of images captured by the autofocus system of FIG. 4 when the lower half aperture is blocked, the upper half aperture is blocked and the aperture is unblocked.
Figure 6B:
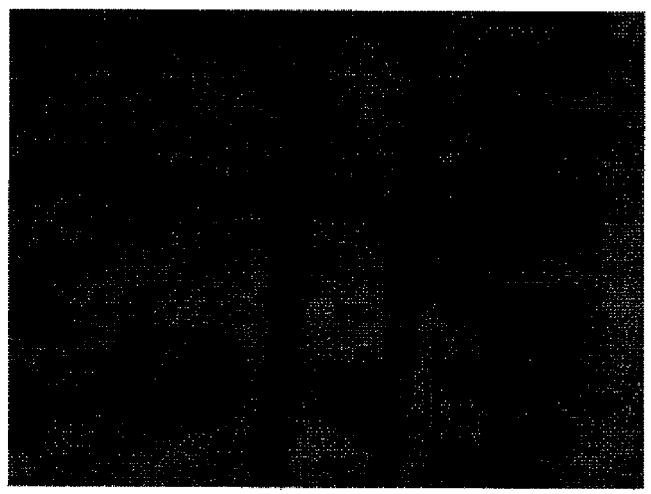
Figure 6C:
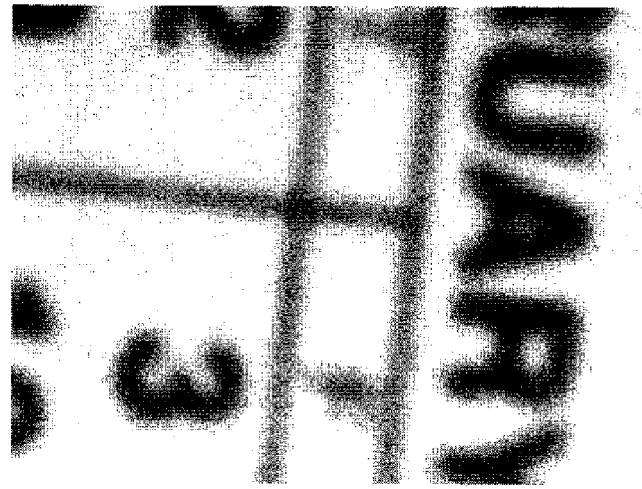

The split aperture measurement of focus is similar to that of a split color filter in that two optical paths are established by alternately blocking half of the aperture. However, in the case of the present invention, which uses a split aperture device, the two optical paths are established at different times and consequently two autofocus images are produced. Distance to focus is detected by measuring a lateral offset between the two images as shown in FIGS. 6a, 6b, and 6c. In FIG. 6a an autofocus still image is captured with the lower half of the aperture blocked. In FIG. 6b, the same image is captured with the upper half of the aperture blocked. It should be noted that the autofocus image in FIG. 6b is shifted vertically compared to the autofocus image in FIG. 6a. The lateral offset between the two autofocus images is accomplished by correlating the two autofocus images to each other and determining the pixel offset between the autofocus images. If the desired portion of the image is well focused, the two autofocus images corresponding to that portion will be accurately superimposed on one another and no offset will be detected. If the desired portion of the image is out of focus, the two images in that portion will be offset relative to one another. The offset distance and the offset direction between the two autofocus images is related to the distance and direction that the moveable lens must be moved to focus that portion of the image.

Figure 7A:
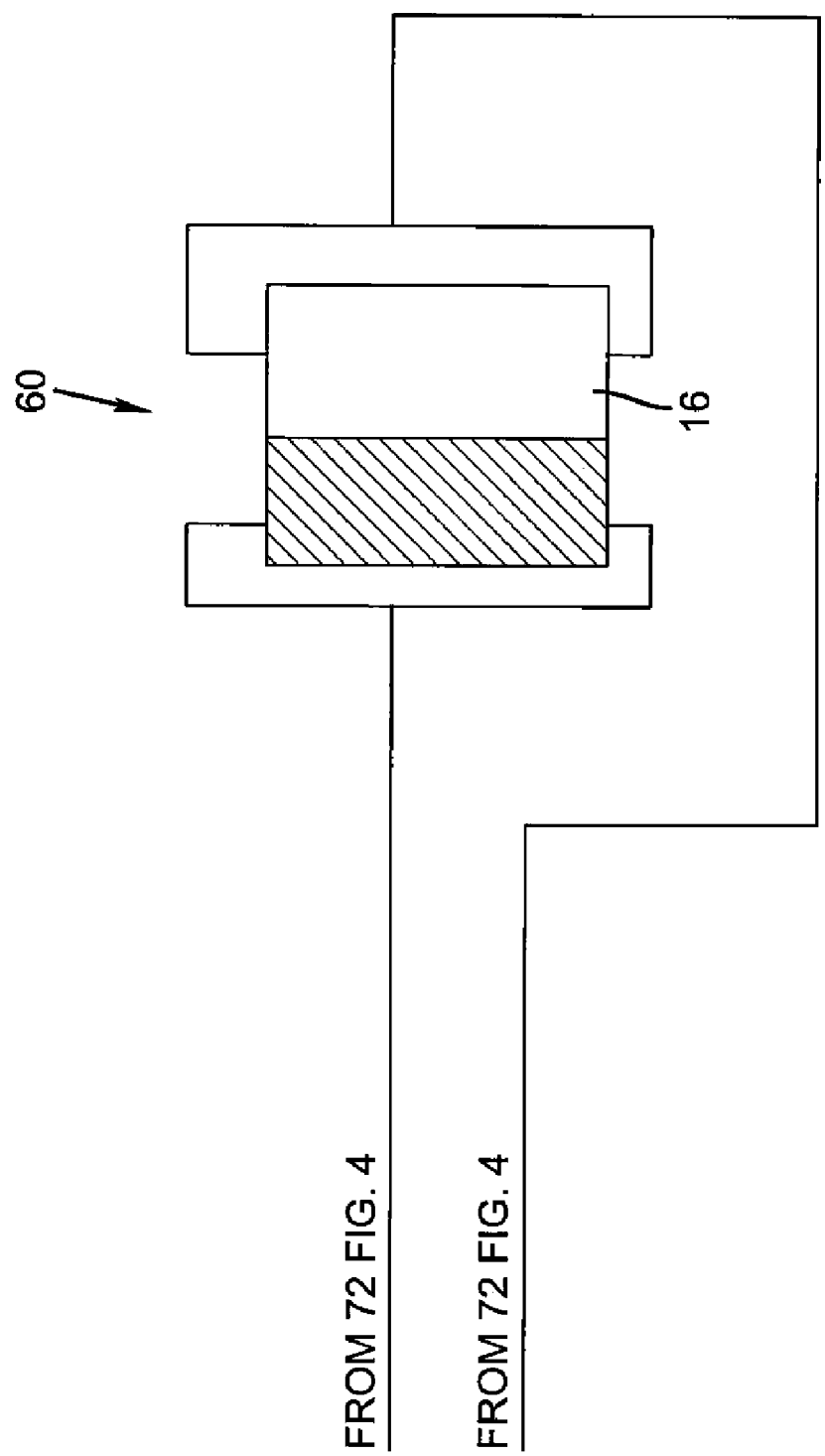
FIGS. 7a, 7b, and 7c show three different operating states for an electrooptical split aperture device.
Figure 7B:
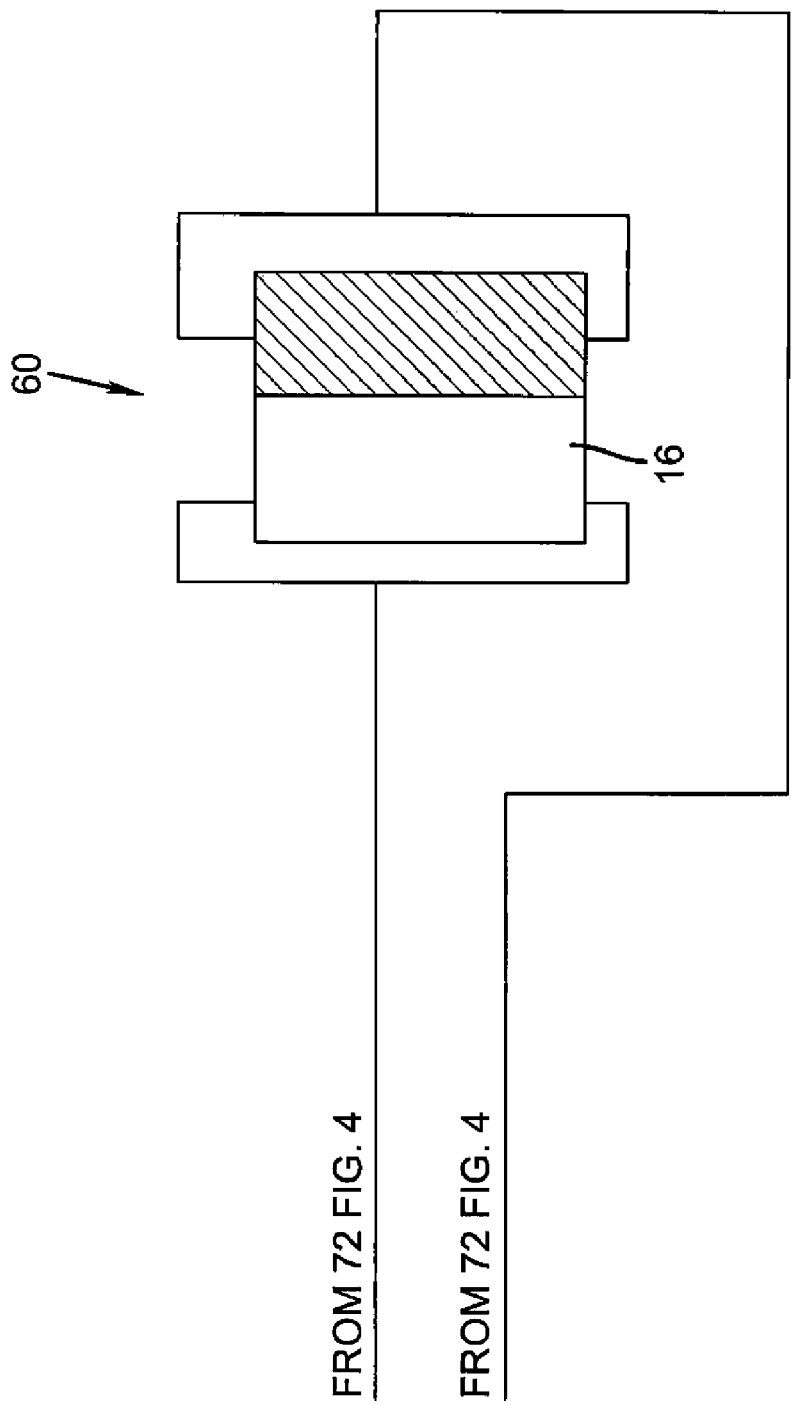
Figure 7C:
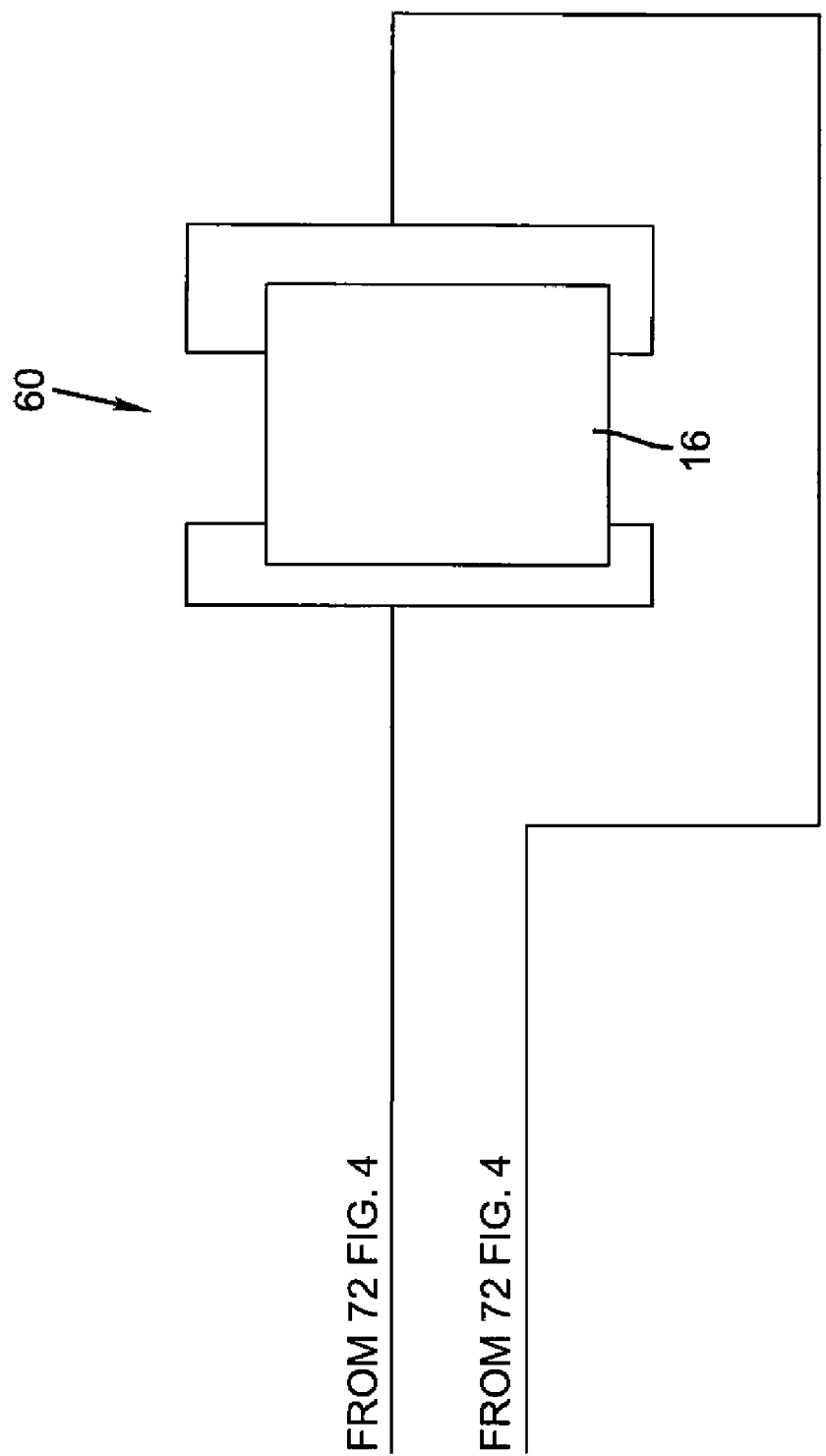

Referring to FIGS. 4 and 5 and FIGS. 7a, 7b, and 7c, a split aperture device 60 is depicted which uses a liquid crystal element. Liquid crystal elements are well known in the art. In this case, the liquid crystal element has two blockers, which can independently operate in two different conditions. In the first condition, the first blocker is transparent and transmits light. In the second condition, the second blocker is opaque and obscures or blocks light which is directed along an optical axis X-X. In FIG. 7a, no voltage difference is applied across the first pixel and it is opaque. A voltage difference is applied across the second pixel and it is transparent. Similarly, in FIG. 7b no voltage difference is applied across the second pixel and the second pixel is opaque and a voltage difference is applied across the first pixel and it is transparent. In FIG. 7c, a voltage difference is applied across both pixels and both are transparent. It should now be clear that the split aperture device 60 includes first and second portions or pixels, wherein each pixel is effective in first and second conditions for respectively transmitting or restricting the light along the optical path X-X from reaching the electronic imager 16.

FIG. 5 shows an adjustable lens system by defining the optical path X-X and including a fixed lens 64 and a movable lens 14. The adjustable lens system causes an image to be focused on an electronic imager 16.

Returning specifically to FIG. 4, the fixed lens 64, the movable lens 14, the split aperture device 60 and the electronic imager 16 are shown. An image sequencer 70 decides the sequence of operation of the split aperture device 60 as depicted in FIGS. 7a, 7b, and 7c. A half shutter controller 72 receives an input from the sequencer 70 and applies voltage differences across the different portions or pixels of the liquid crystal element in the split aperture device 60. The autofocus system works through the sequence shown in FIGS. 7a-7c. In FIG. 7a, the electronic imager 16 captures an autofocus image wherein the first pixel of the liquid crystal element is opaque. This image is directed to an analog to digital converter 74. The image sequencer 70 directs the autofocus image to autofocus temporary storage memory 76. The sequencer then causes a second autofocus image to be captured (See FIG. 7b) and directed to temporary storage memory 78. Step 80, which can be part of a microprocessor, correlates the two stored autofocus images to measure the offset between the two stored autofocus images. When the images are offset an error signal is created which is provided to a moveable lens position controller 82 that operates a lens moving device 84. The lens moving device 84 translates the moveable lens 14 to cause an image of the scene to be in focus when the focused image is to be captured. After focusing, a focused image is captured and moved into image storage 79. This image can be printed or transferred to other devices as is well known in the art.

Figure 8A:
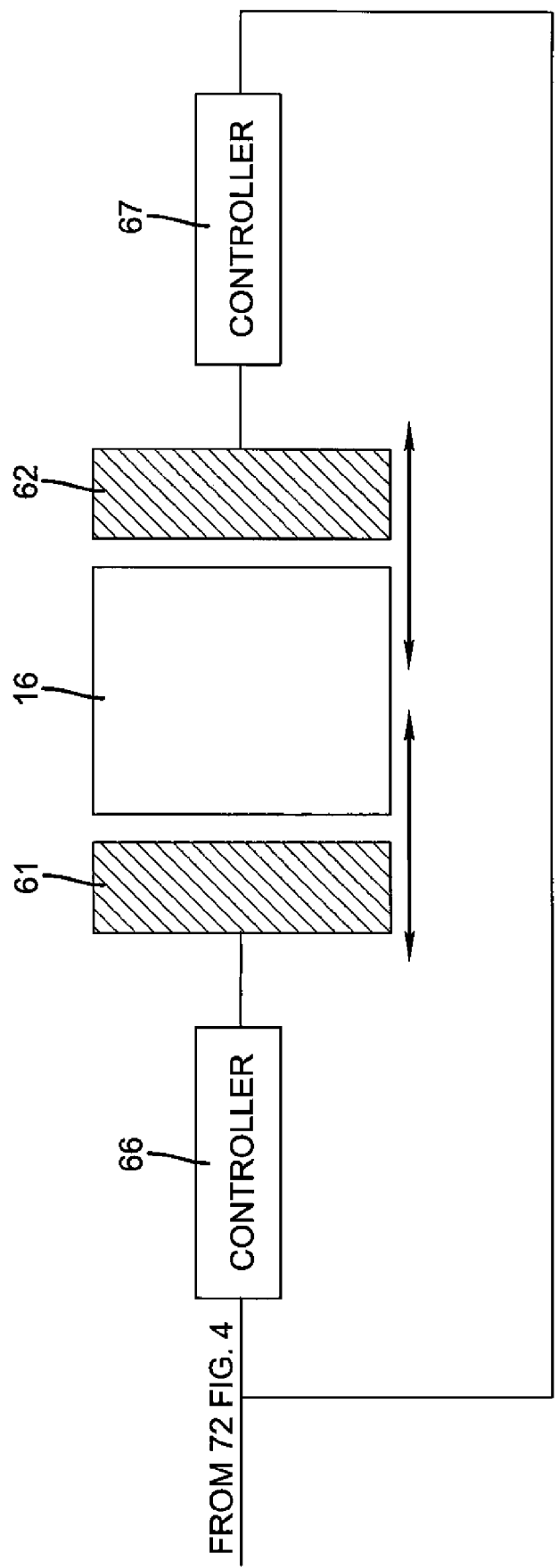
FIGS. 8a and 8b depict two different embodiments of the present invention.

FIG. 8a depicts an embodiment of a mechanical split aperture device 60 which uses a first half aperture blocker 61 and a second half aperture blocker 62. In the first operating state, the half shutter controller 72 signals the first half aperture blocker controller 66 causing the first half aperture blocker 61 to slide and restrict light along the optical path X-X from reaching the imager 16. In the second operating state, the half shutter controller 72 signals the second half aperture blocker controller 67 causing the second half aperture blocker 62 to slide and restrict light along the optical path X-X from reaching the electronic imager 16. A first autofocus image is captured by the electronic imager 16 when the split aperture device is in the first operating state (See FIG. 7a). This image is directed to an analog to digital converter 74. The image sequencer 70 directs the autofocus image to autofocus temporary storage memory 76. The sequencer then causes a second autofocus image to be captured by the electronic imager 16 when the split aperture device is in the second operating state (See FIG. 7b). This second autofocus image is directed to temporary storage memory 78. Step 80 then calculates the offset between the two images. The resulting error signal is provided to the moveable lens position controller 82 which operates the lens moving device 84 which translates the moveable lens 14 causing an image of the scene to be in focus when the focused image is captured. After focusing, the half shutter controller 72 signals both the half aperture blocker controllers 66, 67 so as to permit all light along the optical path X-X to illuminate the imager (See FIG. 7c). In this third operating state, a focused image is captured and moved into image storage 79.

Figure 8B:
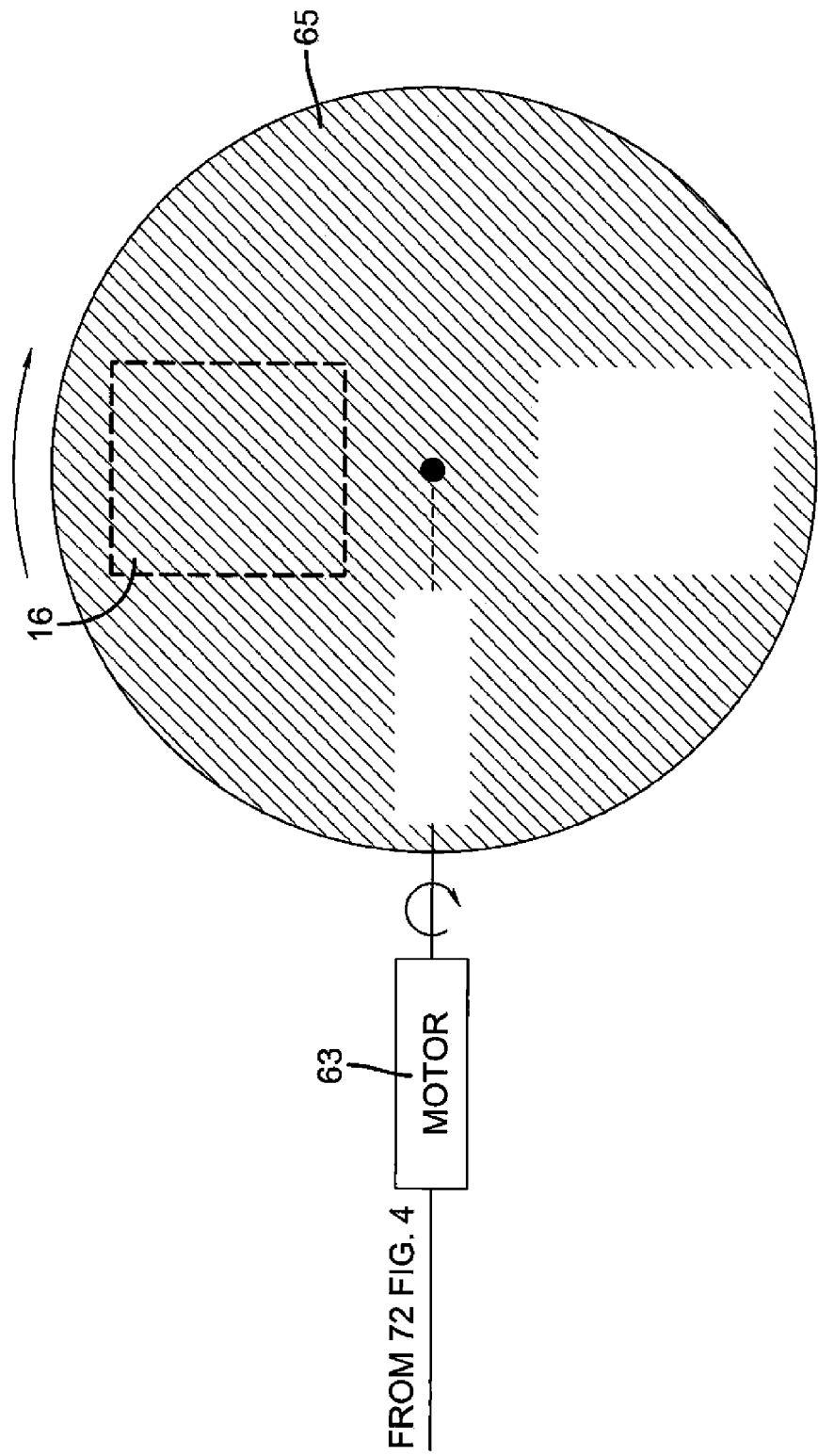

FIG. 8b depicts an embodiment of a mechanical split aperture device 60 which uses a motor 63 to rotate a disc 65. The disc 65 is opaque with two spaced apart openings. In the first operating state, the disc 65 is rotated and stopped so as to permit light along the optical path X-X to illuminate a first portion of the imager 16. In the second operating state, the disc 65 is rotated and stopped so as to permit light along the optical path X-X to illuminate a second different portion of the imager 16. A first autofocus image is captured by the electronic imager 16 when the split aperture device is in the first operating state (See FIG. 7*a*). This image is directed to an analog to digital converter 74. The image sequencer 70 directs the autofocus image to autofocus temporary storage memory 76. The sequencer then causes a second autofocus image to be captured by the electronic imager 16 when the split aperture device is in the second operating state (See FIG. 7*b*). This second autofocus image is directed to temporary storage memory 78. Step 80 then calculates the offset between the two images. The resulting error signal is provided to the moveable lens position controller 82 which operates the lens moving device 84 which translates the moveable lens 14 causing an image of the scene to be in focus when the focused image is captured. After focusing, the disc 65 is rotated and stopped so as to permit all light along the optical path X-X to illuminate the imager (See FIG. 7*c*). In this third operating state, a focused image is captured and moved into image storage 79. It should be noted that those skilled in the art will recognize that this embodiment can be further modified so as to allow the use of a disc that rotates continuously.

Figure 9:
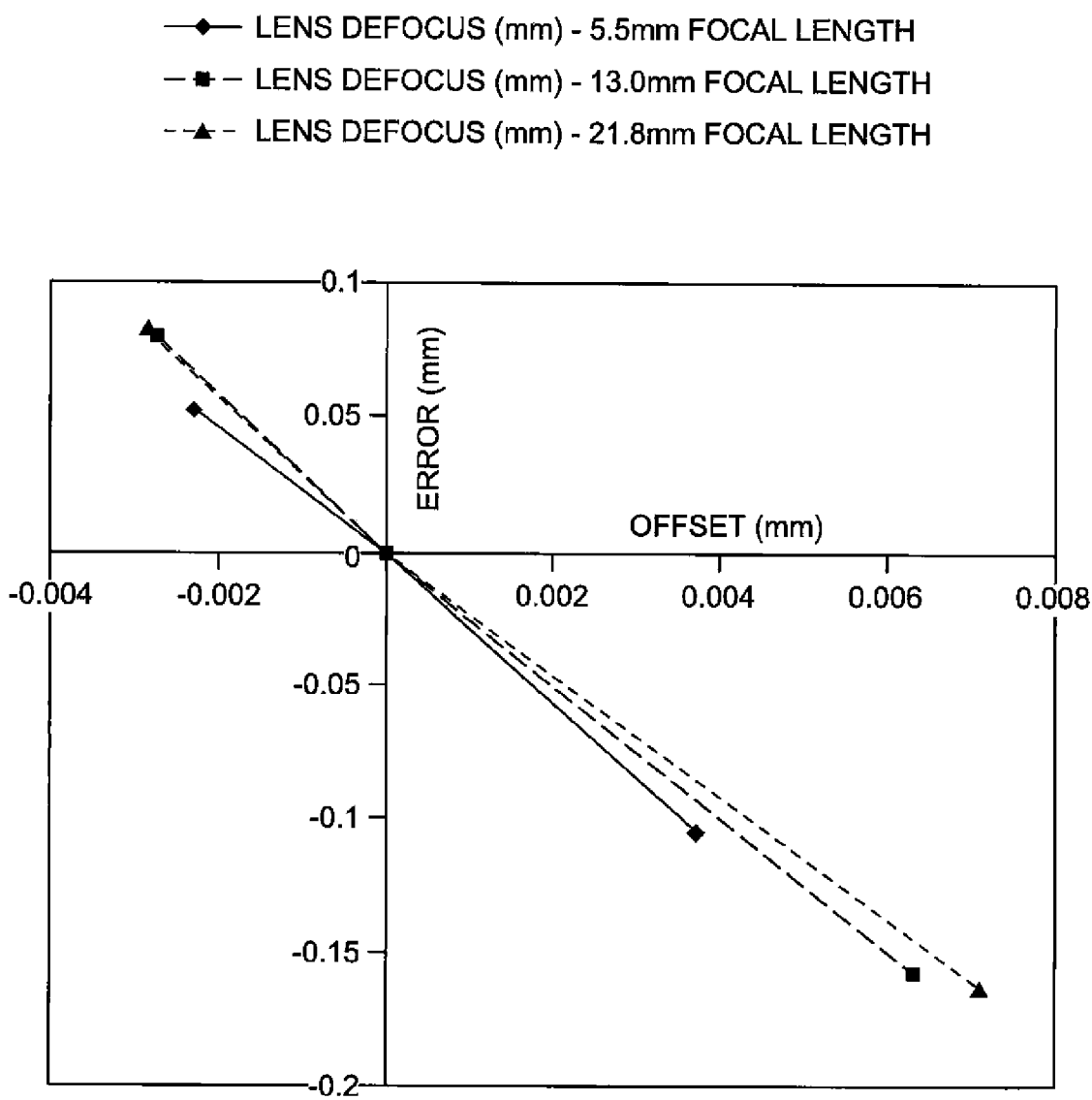
FIG. 9 depicts a graph of lens defocus versus image shift for the autofocus system of FIG. 4.

In step 80, an error signal is produced which is represented by the chart shown in FIG. 9. Each particular camera will have its own chart depending on the camera design. In this illustrative example, when the image is shifted or offset, as shown in the X-axis of the chart, the error signal is the amount of position change needed for the movable lens 14. The chart can be embodied in a look-up table as well understood by those skilled in the art for any particular camera design the chart can be determined experimentally.

autofocus images and the video frame may be different under different embodiments of the invention.

Figure 10:
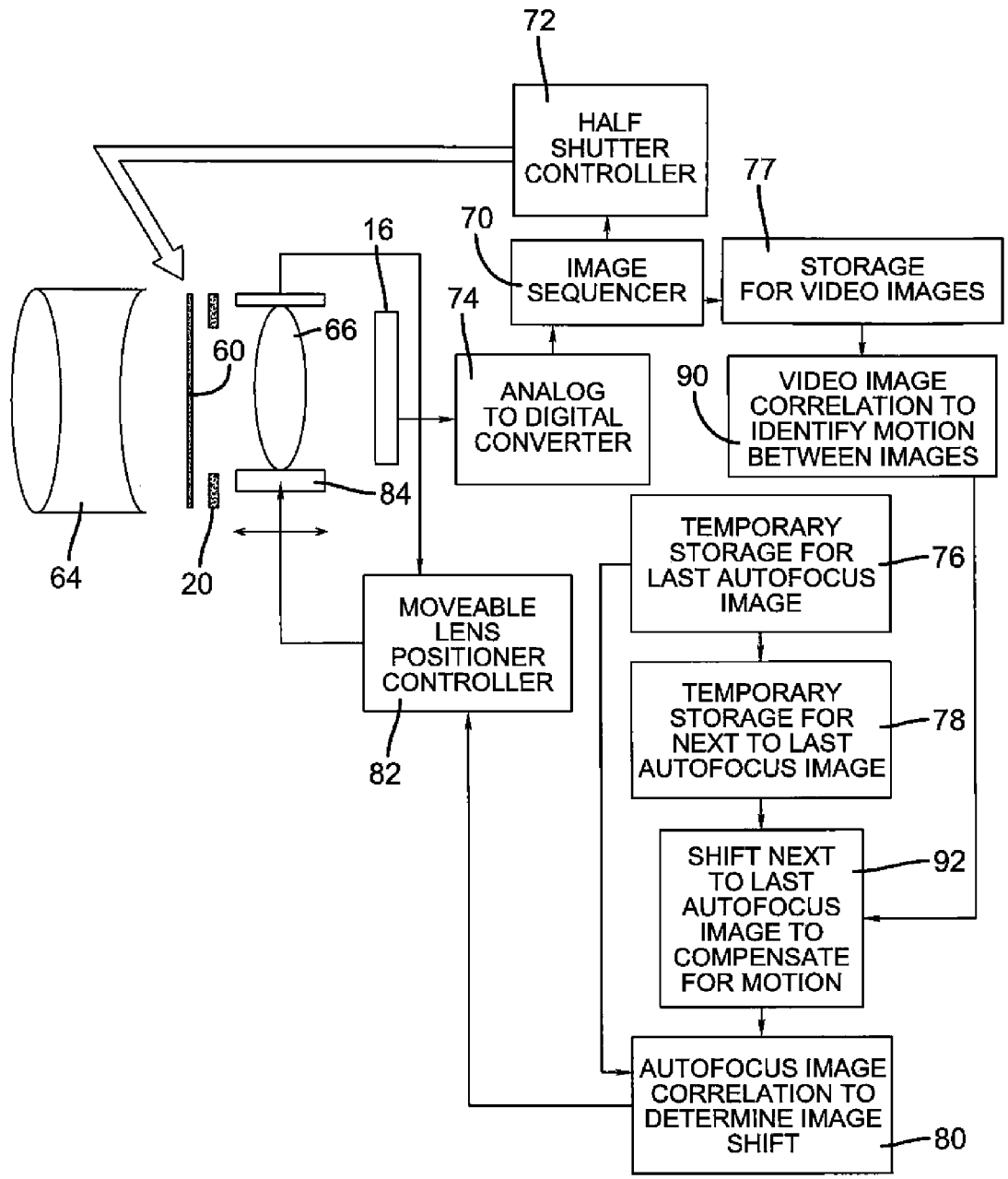
FIG. 10 is a schematic block diagram of an autofocus system for use in capture of video images for compensating for relative motion between the autofocus system and objects in the scene.

FIG. 10 is a schematic block diagram of an autofocus system for use in capture of video frames which includes compensating for relative motion between the autofocus system and objects in the scene. The steps in FIG. 10 can be implemented using a microprocessor as well known to those skilled in the art (See FIG. 1). Where steps correspond to those in FIG. 4, the same numbers will be used. In order to correct for relative motion between an object in the scene and the autofocus system, two substantially focused images must be captured and stored in image storage 77. These images are captured in the same manner as described in FIG. 4. The last two captured video images are then correlated in step 90 to identify motion between the video images. This correlation is well known and has to do with contrast variations between two images. See for example, commonly assigned U.S. Pat. No. 4,673,276, the disclosure of which is incorporated by reference herein. The autofocus process performed in steps 76 and 78 is the same as in FIG. 4. In step 92, the next to last autofocused image is modified to compensate for motion calculated in step 90. So, in effect a new autofocus image is produced and step 80 provides the function described in FIG. 4.

More specifically, in a preferred embodiment of the invention, autofocus images and video images are alternately captured as shown in Table 1 (shown below). For example, the time available for alternating capture of each autofocus image and each video frame is 1/60 sec each when capturing video images at 30 frames/sec. The calculation of the focus condition is then based on the last two autofocus images that have been captured.

TABLE 1

Video Capture with Split Aperture Autofocus

| Time sec | Button Action | Aperture Action | Autofocus Image Capture Action | Video Image Capture Action | Image Analysis Action |
|---|---|---|---|---|---|
| 0 | Push button S0 to S2 | Unblock aperture | | Begin first video capture | |
| 1/60 | | Block first half of aperture | Begin first autofocus capture | Offload video capture and reset all pixels | |
| 1/30 | | Unblock aperture | Offload first autofocus image and reset all pixels | Begin second video capture | |
| 3/60 | | Block second half of aperture | Begin second autofocus capture | Offload video capture and reset all pixels | Correlate first and second video images to define motion within the scene (and camera motion) |
| 2/30 | | Unblock aperture | Offload second autofocus image and reset all pixels | Begin third video capture | Correct the second autofocus image for motion with the scene and calculate the lens motion needed to focus the image. |
| 5/60 | | Block first half of aperture | Begin third autofocus capture | Offload video capture and reset all pixels | Correlate second and third video images to define motion within the scene (and camera motion) |
| 3/30 | | Unblock aperture | Offload third autofocus image and reset all pixels | Begin fourth video capture | Correct the third autofocus image for motion within the scene and calculate the lens motion needed to focus the image |
| to end | | Repeat | Repeat | Repeat | Repeat |

In capturing videos, the system shown in FIG. 4 can also be employed. The blocking arrangement as shown in FIGS. 7*a*, 7*b*, and 7*c* are repeated one time for each frame. For example, if a video has 1800 frames, the autofocusing system will adjust the moveable lens 14 for substantially all the frames. In the sprit of the invention, the order of capture of the two In this embodiment, since the captures of the autofocus images are separated in time, the possibility exists for motion of the camera or autofocus system and motion within the scene, to degrade the focus condition calculation. To further improve the accuracy of the focus measurement, a correction for camera motion or motion within the scene is added. The motion correction consists of comparing the last two video images to each other in step 90 to define the relative motion between the camera and an object in the scene. One or both of the autofocus images can then be modified based on the defined motion in the scene or motion of the camera to correct for the motion of the camera or motion in the scene. By modifying the autofocus image(s) to correct for motion in the scene or motion of the camera, the accuracy of the focus calculation is improved.

A further advantage of this embodiment is that by separating the autofocus image capture from the video image capture, any image degradation from scattered light produced by blocking half the aperture is avoided in the video frames. It should be noted that the autofocus images for any of the embodiments of the invention, can be subsampled images to reduce the number of pixels to enable a rapid offload of the autofocus image from the imager.

The autofocus arrangements that have been described are well suited for use for autofocus of still images as well as video frames, the split aperture device requires some modification of the activities for autofocus during the capture of still images.

Tables 2 and 3 (shown below) show timelines of activities for autofocus using a split aperture device for capture of still images.

TABLE 2

Still Capture with a Split Aperture Device

| Time Msec | Button Action | Aperture Action | Autofocus Image Capture Action | Still Image Capture Action | Image Analysis Action |
|---|---|---|---|---|---|
| 0 | Push button S0 to S2 | Block first half of aperture | Begin subsampled autofocus capture | | |
| 1/60 | | Switch to blocking second half of aperture | Offload first subsampled autofocus image, reset autofocus pixels and begin second subsampled autofocus capture | | |
| 1/30 | | | Offload second subsampled autofocus image, reset the sensor | | |
| 3/60 | | Move aperture blocker away from the aperture | | | Analyze autofocus captures, calculate lens motion needed to focus the image, calculate exposure |
| 2/30 | | | | | Move the lens to focus, adjust aperture and shutter for exposure |
| | | | | Begin full resolution still capture Offload full resolution still image and reset the sensor | |

TABLE 3

Still Capture with a split aperture device

| Time Msec | Button Action | Aperture Action | Autofocus Image Capture Action | Still Image Capture Action | Image Analysis Action |
|---|---|---|---|---|---|
| 0 | Push button S0 to S1 and hold | Block first half of aperture | Begin subsampled autofocus capture | | |
| 1/60 | | Switch to blocking second half of aperture | Offload first subsampled autofocus image, reset autofocus pixels and begin second subsampled autofocus capture | | |
| 1/30 | | | Offload second subsampled autofocus image, reset the sensor | | |
| 3/60 | | Move aperture blocker away from the aperture | | | Analyze autofocus captures, calculate lens motion needed to focus the image, calculate exposure |
| 2/30 | | | | | Move the lens to focus, adjust aperture and shutter for exposure |
| Later | Push button S1 to S2 | | | Begin full resolution still capture Offload full resolution still image and reset the sensor | |

Table 2 shows the timeline of activities for an arrangement that is specifically directed at still image capture, in this case the capture button is immediately depressed all the way down from S0 to S2. Wherein the capture button has three positions: S0 is the starting position where the capture button has not yet been pressed by the operator; S1 is an intermediate position in which the camera calculates autofocus and autoexposure but does not initiate the image capture; S2 is a position in which the camera initiates image capture as soon as autofocus and autoexposure is completed. In the case where the capture button is immediately depressed from S0 to S2, the split aperture device must capture two autofocus images, analyze the autofocus images for offset, calculate the error, calculate the exposure, move the moveable lens to the correct position and adjust the aperture and shutter for exposure prior to capturing the still image. In this case, since the image could be out of focus, the image focus must be measured and corrected before the still image can be captured. Unlike the case for video image capture, during a still image capture, after the autofocus images have been captured, the half aperture blockers can be both made substantially transparent during the still image capture to allow more light for the still capture thereby increasing the light to the image sensor for the still image capture. For example, the time required for autofocus is then approximately the time to capture one video frame or $1/30$ sec. This method is much faster than the typical through the lens contrast based autofocus system which requires 5 to 20 autofocus images to be captured and analyzed resulting in autofocus times of 0.4 to 2.0 sec.

Table 3 shows the timeline of activities for another arrangement wherein the button is first depressed halfway down from S0 to S1 to allow the camera to autofocus and autoexposure prior to depressing the button down the rest of the way from S1 to S2 for still image capture. In this case, the autofocus is accomplished using two autofocus images that are captured each with half the aperture blocked. As in the case described in Table 2 after the autofocus images have been captured, the half aperture blockers can be made to be substantially transparent thereby allowing more light to reach the image sensor for the still image capture. In this case, since autofocus and autoexposure are accomplished prior to the button being depressed from S1 to S2, the final time required for capture when the button is depressed from S1 to S2 is essentially zero.

Table 4 (shown below) shows another timeline of activities of a split aperture device for use in video capture. In this embodiment, when the button 18 is depressed, the first half aperture blocker is made substantially opaque while the second half aperture blocker is made substantially transparent and the first autofocus image capture and the video capture both begin simultaneously. For this specific example, after approximately $1/60^{th}$ sec, the first autofocus image is offloaded from the sensor, that portion of the sensor is reset, the first half aperture blocker is made to be substantially transparent and the second half aperture blocker is made to be substantially opaque. The capture of the second autofocus image is then begun as the capture of the video image continues. After $1/30^{th}$ sec, the second autofocus image is offloaded from the sensor and the video image is offloaded from the sensor, the second half aperture blocker is made to be substantially transparent and the sensor is reset. The process is then repeated while the autofocus images are analyzed to determine the offset and the error, the moveable lens motion required to improve focus, and to calculate exposure. The moveable lens is then moved to the new focus position and adjustments to the shutter to correct for exposure are made.

TABLE 4

Video Capture with Split Aperture Autofocus

| Time sec | Button Action | Aperture Action | Autofocus Image Capture Action | Video Image Capture Action | Image Analysis Action |
|---|---|---|---|---|---|
| 0 | Push button S0 to S2 | Block first half of aperture | Begin autofocus capture | Begin video capture | |
| 1/60 | | Switch to blocking second half of aperture | Offload first autofocus image, reset autofocus pixels and begin second autofocus capture | | |
| 1/30 | | Switch to blocking first half of aperture | Offload first autofocus image, reset autofocus pixels and begin next autofocus capture | Offload video capture, reset and begin next video capture | |
| 3/60 | | Repeat | Repeat | Repeat | Analyze autofocus captures, calculate lens motion needed to focus the image, calculate exposure |
| 2/30 | | | | | Move the lens to focus, adjust shutter for exposure |

The advantages of this arrangement of the invention are that it provides a relatively long exposure for the autofocus image capture and the video images; the movement of the half aperture blockers is relatively simple due to the slower frame rate of the autofocus images; and the offload speeds for the autofocus images and the video images are relatively slow. This arrangement is well suited for the case wherein different pixels on the electronic imager are used for the autofocus images as compared to the video frames.

Another arrangement of the invention uses a split aperture device for autofocus of video images with first and second half aperture blockers that can individually be made substantially transparent or substantially opaque to alternately block one side of the aperture and then the other side of the aperture are used with a fast capture of the autofocus images. For an example, the two autofocus images are first captured while the two sides of the aperture are alternately blocked for $1/120^{th}$ sec each. Following the autofocus image captures, both the half aperture blockers are made substantially transparent for the video frame capture. A timeline for this arrangement is shown in Table 5 (shown below).

TABLE 5

Video Capture with Split Aperture Autofocus

| Time | Button | Aperture | Autofocus Image | Video Image | Image |
|---|---|---|---|---|---|
| 0 | Push button S | Block first half of aperture | Begin autofocus capture | | |
| 1/120 | | Switch to blocking second half of aperture | Offload first autofocus image, pixels and begin second | autofocus capture | |
| 1/60 | | | Offload second autofocus autofocus pixels and begin capt | Begin video capture | Analyze autofocus captures calculate lens motion needed to focus the image |
| 1/30 | | | | calculate exposure Offload video capture and reset | Move the lens to focus, for |
| 5/120 | | Repeat | Repeat | Repeat | Repeat |

Another arrangement of this invention also uses a split aperture device for autofocus with half aperture blockers that can be made substantially transparent or substantially opaque to alternately block one side of the aperture and then the other side of the aperture. For an example, the two autofocus images are captured while the two sides of the aperture are alternately blocked for $1/120^{th}$ sec each. Following the autofocus image captures, the half aperture blockers are both made substantially transparent for $1/60$ second. In this arrangement, the video image capture is actually integrated over the time of both autofocus image captures when half the aperture is blocked and during the time that the aperture is unblocked which constitutes $1/30^{th}$ sec in aggregate. This arrangement can provide a very long exposure for the video image capture.

EXAMPLE 1

A preferred embodiment is described as an example. In this case, a high speed liquid crystal element is used as is available from LC-Tec Display (LC-TEC DISPLAYS AB, Tunavägen 281, SE-781 73 Borlänge, SWEDEN) such as model FOS-PSCT. By applying a voltage of approximately 100 volts, the element changes from white to transparent. The element is arranged in two independently controllable sections to block half of the aperture at a time (half white and half transparent) with the ability to also operate in a substantially unrestricted mode (substantially transparent in both sections) or a completely white mode (white in both sections). In addition, an imager with at least a portion of the pixels being unfiltered or panchromatic are present wherein the unfiltered or panchromatic pixels are used to capture monochrome autofocus images from wavelengths that span substantially the entire visible range of light.

The advantages of the liquid crystal element are that it is capable of transitioning from open to closed in less than 0.001 second and the transmission goes from over 80% in the transparent operating state to less than 5% in the white operating state. The disadvantage of the liquid crystal elements is that in the white operating state the shutter scatters light so that a level of diffuse light is created during the autofocus image captures.

The advantage of using an imager with at least a portion of the pixels being unfiltered or panchromatic is that light losses due to the color filter arrays on the sensor are eliminated thereby allowing very fast autofocus image capture without the need for pixel binning or pixel summing which reduces the resolution of the autofocus image and consequently reduces the accuracy of the focus measurement. Autofocus speed and accuracy are also improved in dim light situations by using an imager with at least a portion of unfiltered or panchromatic pixels that are used for monochrome autofocus images since the light can be gathered more efficiently in the allotted time for the autofocus image capture.

FIG. 4 shows the preferred embodiment for a split aperture device with a high speed liquid crystal element arranged to alternately block half of the aperture at a time during the autofocus image captures. The special imager has color pixels and some pixels that are unfiltered or panchromatic is not shown in FIG. 4 but it is an important feature to enable rapid capture of autofocus images as described in the invention.

Table 5 shows a timeline for the preferred embodiment for a split aperture device in which the autofocus images are captured separately from the video image captures. In this case, the two autofocus images are captured in approximately $1/120$ sec each when capturing video at 30 frames/sec with half the aperture alternately blocked by the high speed liquid crystal element as shown in FIG. 4. Following the capture of the two autofocus images, the aperture is unblocked for a video capture time of approximately $1/60$ sec. During the video capture time, the two autofocus images are analyzed and the moveable lens is repositioned as needed. The process is then repeated to focus each frame of the video segment.

An advantage of the high speed liquid crystal element and the imager with at least a portion of unfiltered or panchromatic pixels is that the autofocus images can be captured separately from the video images. The high speed liquid crystal element can alternately block half of the aperture for the autofocus image captures at a fast enough speed to support the $1/120$ sec exposure times for the autofocus image captures when capturing video at 30 frames/sec. By capturing the autofocus images separately, the scattered diffuse light produced by the high speed liquid crystal element during blocking does not affect the image quality of the video image. And, by using an imager with at least a portion of unfiltered or panchromatic pixels, the light gathering of the sensor is efficient enough to enable the autofocus images to be captured in $1/120$ sec.

EXAMPLE 2

In a further preferred embodiment as an example, that is particularly suitable for still capture, a split aperture device is used. In this embodiment, the moveable lens is positioned at an extreme position, either at near focus or far focus positions, prior to the capture of the autofocus images, the image will be substantially out of focus and a large difference between the two autofocus images is assured. The advantage of this embodiment is that a large signal is provided for analysis to determine the moveable lens position required for best focus quality. The timing for the capture of the autofocus images and the still image would then be similar to that shown in Tables 2 and 3.

EXAMPLE 3

In another preferred embodiment as an example, in situations where the scene content is rapidly changing, the change of focus, frame to frame, may be faster than desired. In this case, a limit can be applied to the rate of change of the focus between frames. Each frame would still be focused individually but the change of focus between frames would not be allowed to exceed the limit. By limiting the focus change between frames, the focus changes would appear smoother in the video segment.

EXAMPLE 4

In a further preferred embodiment, a system similar to that described in Example 1 is used with a high speed liquid crystal element that can block half of the aperture at a time or leave the aperture substantially unblocked. Autofocus images and video images are alternately captured as shown in Table 5. In this embodiment, the time available for the autofocus image capture is increased to 1/60 sec, when capturing video images at 30 frames/sec, to improve the autofocus performance under low light conditions. The calculation of the focus condition is then based on the last two autofocus images that have been captured. In this case, since the autofocus image captures are separated in time, the possibility exists for motion within the scene to degrade the focus condition calculation. To enable a correction for motion within the scene or motion of the camera, the two video images are correlated with each other to identify any motion within the scene or motion of the camera. At least oen of the autofocus images is then modified to correct for motion in the scene and motion of the camera prior to the calculation of the focus condition. Focus adjustments are then applied to the next video image capture.

The invention has been described in detail with particular reference to certain preferred embodiments thereof, but it will be understood that variations and modifications can be effected within the spirit and scope of the invention.

PARTS LIST 12 adjustable lens system
14 movable lens
16 electronic imager
18 button to initiate capture
20 iris
22 digital signal processor
24 digital storage element
30 beginning capture sequence step
32 capturing autofocus images step
34 analyzing autofocus images step
36 moving moveable lens step
38 capturing image step
40 beginning continuous video image capture step
42 capturing images with moveable lens step
44 measuring the contrast step
46 identifying the image with the highest contrast step
48 moving the moveable lens step
50 capturing continuous video images step
52 evaluating images step
60 split aperture device
61 first half aperture blocker
62 second half aperture blocker
63 motor
64 lens assembly
65 disc
66 first half aperture blocker controller
67 second half aperture blocker controller
70 image sequencer
72 half shutter controller
74 analog to digital converter
76 last autofocus image temporary storage
77 storage for video images
78 next to last autofocus image temporary storage
79 image storage for video or stills
80 autofocus image correlation step
82 moveable lens positioner controller
84 focus lens mover motor
90 video image correlation step
92 shifting next to last autofocus image step

The invention claimed is:

1. A method for operating an autofocus system for focusing an image on an electronic imager, comprising:
   a. providing an adjustable lens system defining an optical path for scene light and having at least one movable lens to focus an image of the scene onto the electronic imager and wherein the electronic imager includes color and unfiltered or panchromatic pixels;
   b. causing a first portion of the scene light to be obscured so that the color pixels and unfiltered or panchromatic pixels of the electronic imager captures a first autofocus image and causing a second different portion of the scene light to be obscured so that the color pixels and unfiltered or panchromatic pixels of the electronic imager captures a second autofocus image wherein portions of the first and second autofocus images are offset; and
   c. moving the movable lens in response to the offset to a position so that an image to be captured will be in focus.

2. The method for operating an autofocus system of claim 1 further including a split aperture device effective in first and second conditions for blocking light and transmitting light respectively.

3. The method for operating an autofocus system of claim 2 wherein the split aperture device is formed with at least one liquid crystal element having two independently operated pixels.

4. The method for operating an autofocus system of claim 2 wherein the split aperture device is a mechanical shutter with first, second and third operating states; wherein the first and second operating states restrict the light in the first and second portions of the optical path respectively and the third operating state allows the light to pass substantially unrestricted to illuminate the electronic imager.

5. The method for operating an autofocus system of claim 4 wherein the mechanical shutter is a rotating disk wherein portions of the disk have been removed to provide the first, second and third operating states.

6. The method for operating an autofocus system of claim 4 wherein the mechanical shutter is composed of one or more sliding members providing the first, second and third operating states.

7. The method for operating an autofocus system of claim 1 wherein the autofocus system is used repeatedly during video capture to focus the video frames.

8. The method for operating an autofocus system of claim 7 wherein the first and second autofocus images are alternately captured with video frames.

9. The method for operating an autofocus system of claim 7 wherein the autofocus images are corrected for the relative motion of the autofocus system and objects in the scene that occurs between the first and second autofocus images.

10. The method for operating an autofocus system of claim 7 wherein the focus change between video images are limited to remain below a selected value to produce a smoother focus transition as the scene changes.

11. An autofocus system for focusing an image on an electronic imager during video capture, comprising:
   a. an adjustable lens system defining an optical path having at least one movable lens to focus an image onto the electronic imager;
   b. a split aperture device which includes first and second light transmitting portions each being effective in first and second conditions for respectively restricting light along the optical path from reaching the electronic imager and transmitting light onto the electronic imager;
   c. means for operating the split aperture device repeatedly during video capture to cause the first portion to be in the first condition and the second portion to be in the second condition so that the electronic imager captures a first autofocus image and then to cause the first portion to be in the second condition and the second portion to be in the first condition so that the electronic imager captures a second autofocus image wherein portions of the first and second autofocus images are offset;
   d. means responsive to the offset for causing the adjustable lens system to focus the image onto the electronic imager and wherein the first and second autofocus images are alternately captured between video frames and wherein the focus change between video frames is limited to remain below a selected value to produce a smooth focus transition as the scene changes; and
   e. means for causing the first portion and the second portion of the split aperture device to be in the second condition when the electronic imager captures a focused image.

12. The autofocus system of claim 11 wherein the split aperture device is electro-optical and the first and second portions are effective in first and second conditions for blocking light and transmitting light respectively.

13. The autofocus system of claim 12 wherein the split aperture device is formed with at least one liquid crystal element having two independently operated pixels.

14. The autofocus system of claim 11 wherein the split aperture device is a mechanical shutter with first, second and third operating states; wherein the first and second operating states restrict the light in the first and second portions of the optical path respectively and the third operating state allows the light to pass substantially unrestricted to illuminate the electronic imager.

15. The autofocus system of claim 11 wherein the autofocus images are corrected for the relative motion of the autofocus system and objects in the scene that occurs between the first and second autofocus images.

16. The autofocus system of claim 11 wherein the electronic imager includes color pixels and unfiltered or panchromatic pixels.

17. The autofocus system of claim 16 wherein the unfiltered or panchromatic pixels are used for capturing the autofocus images.

* * * * *

UNITED STATES PATENT AND TRADEMARK OFFICE
CERTIFICATE OF CORRECTION

PATENT NO. : 7,561,789 B2  Page 1 of 1
APPLICATION NO. : 11/427531
DATED : July 14, 2009
INVENTOR(S) : John N. Border et al.

It is certified that error appears in the above-identified patent and that said Letters Patent is hereby corrected as shown below:

| | |
|---|---|
| Column 18, Line 26 (Approx.) | In Claim 1, after "color" insert -- pixels --. |
| Column 18, Line 30 (Approx.) | In Claim 1, delete "captures" and insert -- capture --, therefor. |
| Column 18, Line 34 | In Claim 1, delete "captures" and insert -- capture --, therefor. |

Signed and Sealed this

Nineteenth Day of January, 2010

David J. Kappos
*Director of the United States Patent and Trademark Office*